United States Patent Office 2,965,936
Patented Dec. 27, 1960

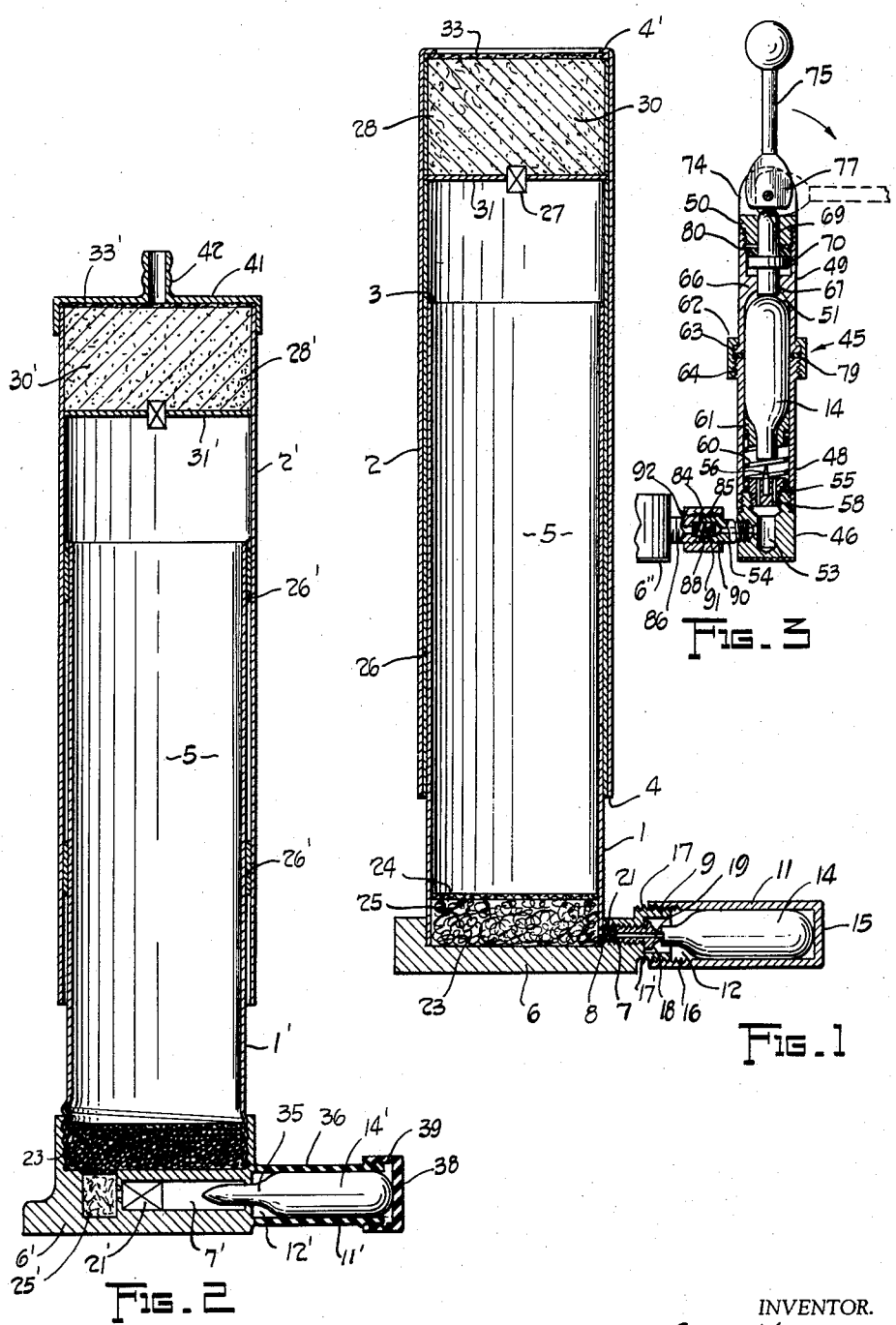

2,965,936

STERILIZING APPARATUS EMPLOYING GAS

Saul Kaye, Maple Heights, Ohio, assignor to Ben Venue Laboratories Inc., Pittsburgh, Pa., a corporation of Pennsylvania Filed June 25, 1957, Ser. No. 667,813

21 Claims. (Cl. 21—91)

This invention relates to apparatus and methods for gaseous sterilization and more particularly to apparatus and method for sterilizing surgical, medical and dental instruments, dressings, precision apparatus and tools, and the like by means of vapors, without the use of heat, moisture or corrosive liquids, by means of gaseous sterilants such as, for example, ethylene oxide and other epoxides or mixtures thereof.

The term "sterilization" is used in this disclosure in its strictest technical sense and means the complete elimination of all forms of microorganisms from all surfaces of the material exposed to the extent the same may be determined under the most stringent conditions possible and the terms "sterilant" or "sterilizing agent" mean a substance capable of accomplishing sterilization in accordance with the definition herein given.

The value of certain of the epoxides as effective sterilants for eliminating all forms of microorganisms has been known for over twenty years. Of these epoxides, ethylene oxide has proven the most effective, but it has not been adopted as a sterilant for wide general use, field use, small installations and/or where only inexperienced or untrained personnel are available because of the many dangers and difficulties attendant its use and incident to its physical and chemical properties, and especially because it is highly toxic, flammable and forms an explosive mixture with air and because its use has required vacuum pumps and specially designed and bulky autoclaves and other types of apparatus.

A mixture of ethylene oxide and carbon dioxide in the ratio of one to seven by weight is not flammable and has been made available commercially as a liquid solution under high pressure but here again the inherent dangers in the use of the mixture and the special apparatus and bulky cylinders necessary for its use have precluded its adoption for small installations, field use, and/or where only inexperienced or untrained personnel are available.

It is therefore a general object of my invention to provide an improved method and apparatus for sterilizing. A further object of my invention is the provision of a method and apparatus for sterilizing medical, surgical and dental instruments, dressings, precision tools and the like, which does not bring heat, moisture or corrosive liquid into contact with the items being sterilized; which does not have a deleterious effect on delicate cutting edges, cement mountings for optical instruments and the like or on plastic tubing or on other materials such as certain kinds of rubber, leather or wool; which effectively sterilizes instruments having rough or unusual surfaces, capillary tubes and the like; and which is adapted for field use, small installations and is safe for use by inexperienced or untrained personnel.

Another object of my invention is the provision of a practical method and apparatus for sterilizing which utilizes a toxic, explosive, vapor phase sterilant such as, for example, ethylene oxide and which is adapted for use in offices, in the field and for and by unskilled persons without danger to themselves or others.

Further objects of my invention are the provision of sterilizing apparatus for use with ethylene oxide or a sterilizing agent having similar properties, which is portable, economic to manufacture and use, simple and safe to operate and light-weight; which may be operated at room temperature and at or near atmospheric pressure; which does not require the use of high pressure and/or high vacuums; which includes a readily replaceable source of sterilant gas; which supplies sufficient sterilant for one cycle of operation when and as desired by the user; which controls the flow of exhausted sterilant into the atmosphere so as to prevent toxic concentrations thereof adjacent the sterilizer and/or which precludes the necessity of handling the sterilized object after sterilizing is complete.

Still other objects of my invention include the provision of a method for sterilizing using ethylene oxide or a sterilant having similar characteristics and properties; which is effective at room temperatures and pressures at or near atmospheric; which is economical to practice; which is safe and does not require skilled practitioners; which may be used in field, office or other locations without the need of heavy, bulky, complicated or expensive equipment and apparatus; which utilizes individual ampules or containers of sterilant; which obviates handling the sterilized objects or instruments after sterilization is completed and/or which is commercially and practically feasible for widespread general use.

These and other objects and advantages of my invention will become apparent from the following descriptions of preferred and modified forms thereof, reference being made to the drawings attached hereto in which:

Figure 1 is a vertical section of a sterilizer embodying a preferred form of my invention, and Figure 2 is a vertical section of a sterilizer embodying modified forms of my invention, and Figure 3 is a vertical section of a part of a sterilizer embodying my invention and showing another preferred form of housing and release mechanism for the ampule or container of sterilant.

Briefly and broadly my method of sterilizing preferably comprises the steps of placing the objects or instruments or material to be sterilized in a porous envelope or container, placing the envelope or container within a vessel, reducing the pressure within the vessel, having the interior of the vessel in communication with a chamber having therein an ampule or vessel containing a solution of ethylene oxide and a diluent which is a flammability suppressant therefor and preferably a diluent with boiling point and vapor pressures so related to the boiling point and vapor pressures of the ethylene oxide that the sterilant is nonflammable and non-explosive in all vapor-liquid phases and relationships, such as that described in my co-pending application Serial No. 651,873, filed April 10, 1957, now Patent No. 2,891,838, releasing the sterilant from the container while maintaining the vessel closed, evaporating and admitting the sterilant to the vessel, permitting the sterilant to sterilize the objects or instruments and evacuating or air washing the vessel and contents without admitting toxic quantities of the sterilant to the atmosphere adjacent the vessel or admitting contaminating organisms into the vessel, all at room temperature.

My invention also includes preferred apparatus, see Figure 1, for carrying out the above described method. The apparatus embodying the preferred form of my invention is simple and safe to operate and functions at room temperatures; is economic to manufacture, supply, operate and maintain; is portable and convenient to handle, store and use; and is safe for use by unskilled persons and is particularly adapted for field use and use in offices or other "on the job" locations by surgeons, dentists and the like. Further, my apparatus is adapted to permit the safe and sure use of an ethylene oxide sterilant without danger of explosion or of inducing toxicity into the surrounding atmosphere.

Preferably and broadly my sterilizing apparatus comprises a pair of nested enclosures or vessels having communication with each other and defining a space or chamber within which the instruments, objects or material to be sterilized are disposed. The chamber is adapted to be in communication with a receptacle for sterilant, the atmosphere and preferably with a source of purging gas. The enclosures are adapted to be reciprocated relative to each other to vary the size of the chamber and/or to pump vapor or gas into, out of and/or through the chamber. Further means is provided to orient or restrict fluid flow into the chamber from the receptacle for sterilant and the source of purging gas and out of the chamber into the atmosphere.

More particularly, apparatus embodying a preferred form of my invention preferably comprises a pair of nested concentric hollow cylinders 1 and 2 preferably having their respective near or overlapping ends 3 and 4 in mutual communication with each other and defining the side walls of a chamber 5 within which the instruments, objects, or material to be sterilized are placed and within which the sterilization is accomplished. The cylinders 1 and 2 are impermeable and of at least moderate rigidity and may be conveniently formed from aluminum. Preferably, as will hereinafter more fully appear, the other end, upper as viewed, of cylinder 2 is also open and is formed with an inwardly extending flange 4'.

The cylinder 1 is preferably secured to or formed integrally with a base 6, which closes the lower end of the chamber 5, supports the sterilizer and preferably provides means for conducting the sterilant to the chamber 5 and valve means adapted to permit the flow of fluids into but not out of the chamber 5.

To this end a passage or bore 7 is provided in the base 6. One end 8 of passage 7 opens into the chamber 5 and the other end 9 leads to the exterior of base 6 and is in communication with and/or partly houses a source of sterilant. Preferably the sterilant is contained in a sealed container disposed in a chamber or housing which is in closed communication with the passage 7 and thereby chamber 5 and means is provided for fracturing or opening the container without permitting the freed sterilant to reach the atmosphere outside the apparatus.

To this end a housing 11 is mounted on the base 5 and together with the end 9 of passage 7 defines a chamber 12 within which an ampule or container 14 containing liquified sterilant is disposed. The ampule 14 is adapted to be opened from without the housing 11 without permitting the sterilant to escape from the chamber 12 except via the passage 7. Conveniently the housing 11 is a rigid tubular member having a closed end 15 which prevents the undesired escape of released sterilant from the apparatus and internal threads 16 which engage and are adapted to be drawn up on threads 17 formed on hollow bushing 17' which is mounted on base 6. Threads 17 are concentric with, and bushing 17' axially extends, passage 7 and forms a part of chamber 12.

Preferably the sterilant confined in the ampule 14 comprises a mixture of ethylene oxide and a diluent, and may, for example embody the teachings of my co-pending application Serial No. 651,873, referred to above, albeit other sterilants such as a mixture of ethylene oxide and carbon dioxide may be used at the discretion of the user. The sterilant is preferably confined in the ampule as a liquid under about 15 p.s.i.g. pressure and preferably vaporizes readily at room temperatures upon being released from the ampule to form a gas which is heavier than air.

The ampule is preferably of metal and of the same type as is commonly used for marketing carbon dioxide for soda syphons, life jackets and the like and has a seal at one end of thinner material than the rest of the ampule, as is well known in the art, albeit it may be of a fracturable material such as that disclosed and described below in connection with the form of my invention shown in Figure 2.

The housing 11 is formed from a material which is impervious to the solvent effect of the liquid phase of the sterilant and the pressure of the vapor phase of the sterilant.

The use of separate ampules or containers as a source of sterilant provides for the ready handling and storage of the sterilant, for simplified measuring of just that amount of sterilant necessary for an operational cycle of the apparatus and for the ready, selective admission of the sterilant to the chamber 5.

In order to provide means for selectively opening or piercing the ampule 14 to free the sterilant, I preferably provide, adjacent the end 9 of passage 7, within the bushing 17', a sharp cylindrical knife, edge or piercing tool 18, which is mounted on base 6 concentric with the passage 7 and has a bore 19 which is in communication with and an axial extension of the passage 7. The piercing tool 18 is adapted to pierce or puncture the seal when the ampule is forced thereagainst. The tool 18 is so positioned with respect to the threads 17 and the threads 16 and 17 and housing 11 and ampule 14 are so related as to length that the housing 11, containing the ampule, may be mounted on the base and drawn up until the seal bears upon the tool so as to provide adequate support for the housing without piercing the ampule and then when and as it is desired to free the sterilant for admission into the chamber 5 the housing 11 may be further drawn up on the threads 17 to exert the force and induce the relative movement necessary for the tool 18 to pierce the ampule seal.

A valve 21 is disposed within the passage 7 between the ends thereof and is adapted to prevent the flow of gases, vapor or liquid from end 8 through the passage 7 so that sterilant, gas or liquid, and purging air or gas may be admitted from the end 9 of passage 7 into the chamber 5 but spent sterilant is not exhausted out through the passage 7 when the end 9 thereof is open to the atmosphere.

As will hereinafter more fully appear housing 11 is removed when and as it is desired to admit purging gas or air to the apparatus either from the atmosphere or another source, which is properly interconnected to end with the passage 7 and bushing 17'.

In order to facilitate and increase the rate at which the sterilant evaporates into the chamber 5 when released from the ampule, I prefer to provide means for increasing the surface area over which the liquid sterilant flows. Conveniently such means comprises a plurality of aluminum turnings, glass or ther beads or the like 23, which are disposed in the bottom of the chamber 5.

Preferably an apertured false bottom 24 is mounted at the lower end of chamber 5 and cylinder 1 to retain the aluminum turnings in place and provide a more satisfactory surface for supporting the instruments, objects and material within the chamber 5 and a filter pad or mat 25 conveniently of asbestos, cotton, or glass fibres is disposed adjacent the bottom 24 to remove bacteria and other contamination from the purgent.

As previously noted I prefer that the sterilization chamber be purged by means of a purging gas when sterilization is completed and conveniently air is used for this purpose. Accordingly my apparatus includes means to induce a flow of air, for purging, into and through the passages and sterilization chamber.

To this end, as previously stated, the cylinders 1 and 2 are adapted to be reciprocated relative to each other—relative motion between the cylinders to enlarge the size of chamber 5 causing fluid to flow into the chamber and relative motion to reduce the size of the chamber 5 causing fluid to flow out of the chamber—and sealing and valve means are provided to give direction to the fluid flow and prevent leakage from or into the chamber except as desired. The sealing and valve means also prevents leakage of the sterilant from the sterilization chamber during sterilization and so precludes a reduction in the concentration of the sterilant or contamination of the surrounding atmosphere during sterilization. Further, as will hereinafter more fully appear, the sealing and valve means together with the relative motion of the cylinders to enlarge the chamber 5 and the closed housing 11 provide means for reducing slightly the pressure within chamber 5 just after admitting the sterilant thereto in order to facilitate the sterilization process by enhancing the contact between the sterilant and the contaminating microorganisms and to accomplish the sterilization at or near atmospheric pressure. Preferably the sealing means is disposed between the cylinders 1 and 2 to prevent leakage therebetween and is secured to one of the cylinders and has a vapor tight though sliding fit with the other cylinder. Conveniently the sealing means comprises a flocked paper or similar cylinder 26, which is fitted within cylinder 2 and has sufficient resiliency to form an effective sliding seal with cylinder 1.

The valve means for controlling the flow of fluid into and out of the chamber 5 preferably comprises the valve 21, which admits fluid from and through the passage 7 and a second valve 27 adapted to permit fluid to flow from but not into the chamber and preferably disposed in the upper wall thereof.

The valve 27 is conveniently substantially similar to the valve 21 except that its seat is reversed relative to the chamber. Thus when the cylinders are repeatedly reciprocated relative to each other, they operate as a pump drawing air, gas or vapor into the chamber through the valve 21 and expelling air, gas or vapor from the chamber through valve 27.

My apparatus also preferably includes means upstream of the valve 27 to adsorb the noxious and toxic portion of the sterilant, when the same is evacuated from the chamber 5, and to prevent the said portions from entering the atmosphere in hazardous, obnoxious, or toxic quantities.

The adsorbent may be permanent or alternatively the adsorbent may be such as to slowly desorb the sterilant and release the same into the atmosphere in non-toxic quantities when the apparatus lies unused.

To this end I preferably provide a cartridge or container 28 containing an adsorbent 30, such as activated carbon, therein and preferably valve 27 is disposed in and functions as the entrance to the cartridge 28. When as I prefer, the seal 26 comprises a cylindrical liner for the cylinder 2 the cartridge 28 may be formed as a part thereof with the lower or bottom wall of the cartridge being impermeable, except for valve 27, and forming the upper wall of chamber 5 and the upper or top wall 33 of the cartridge seating upon the flange 4' and comprising a screen or similar member providing communication with the atmosphere but retaining the adsorbent within the cartridge.

In operation the housing 11 is removed from the base 6, an ampule of sterilant is inserted, neck first, into chamber 12 and the housing replaced being tightened only sufficiently to bring the ampule into engagement with the cutting tool 18 without puncturing the ampule. Previously, concurrently or when desired cylinder 2 is removed from cylinder 1 and the instruments, for example, to be sterilized are placed within chamber 5 and cylinder 2 is replaced and pushed all the way over cylinder 1. When it is desired to effect the sterilization of the instruments, the housing 11 is drawn up tighter forcing the ampule and cutting tool into operative engagement so as to puncture the ampule and release the sterilant. The sterilant then flows in both liquid and vapor phases along passage 7, through valve 21 and into the chamber 5, the remaining liquid flowing into contact with the turnings 23 and thereby being vaporized more quickly. Before, during, or immediately after thus releasing the sterilant, the cylinders are sharply pulled apart as much as possible without causing them to separate, thereby reducing the pressure within the chamber 5, since the housing 11 prevents the air from entering the passage 7 and passing through valve 21. This releases air blocks about the instruments, and especially in and at the intricate portions thereof. The cylinders are preferably then quickly returned to their most tightly closed position, thus expelling some of the contents of chamber 5 which is relatively rich in air, and allowing subsequent evaporation to fill the chamber more completely with sterilant vapor. The apparatus is then allowed to stand a predetermined period of time during which time the sterilant, and more particularly the ethylene oxide therein, effectively and completely kills the contaminating spores, bacteria and other organism on the instruments. When sterilization is complete and the instruments are again desired for use, the housing 11 is removed and the cylinders are reciprocated relative to each other (or pumped) five or so times to draw air (or other purgent) into chamber 5 through valve 21 and to remove adsorbed sterilant from the surfaces of the instruments and to expel the used sterilant out through valve 27 and into the cartridge 28 where it is adsorbed. The instruments may then be removed as desired and the apparatus is ready for a new cycle. The adsorbed sterilant remains in the cartridge where it is destroyed and/or is desorbed slowly into the air.

Preferably and if desired the instruments, devices or other material to be sterilized are inclosed in a permeable wrapping before being placed within the chamber 5. The wrapping is adapted to permit the removal of air, vapor or other gases from the instruments or materials enclosed therein, as by reducing the pressure within the chamber 5, and to permit the relatively rapid diffusion or penetration of the sterilant through the wrapping and into functional engagement with the instruments or materials within the wrapping and the organisms thereon and may for example be an envelope of paper toweling or of kraft paper.

Additionally the wrapper filters or acts as a barrier to contaminating microorganisms deposited by the air, hands or skin or other surfaces and/or other carriers preventing them from entering within the wrapper and into contact with and settling upon the instruments or materials within the wrapper. Therefore, after treatment, the wrapper may be handled without aseptic precautions while retaining the sterility of the instruments, objects or materials within the package and the entire package may be removed from the chamber 5 and stored conveniently until the sterilized instruments, objects, or material are needed.

Conveniently an apparatus embodying my invention may be about 12 inches high and have an outside diameter of 3¼ inches and the ampule may have 15 grams of liquefied sterilant therein comprised of from 10 to 50 mole percent of ethylene oxide, from 50 to 0 mole percent of dichlorodifluoromethane and from 90 to 50 mole percent of trichloromonofluoromethane. With such an apparatus and when the preferred embodiment and procedure of my invention is followed I find that an exposure of ½ hours for scapels, 1 hour for dental burs, and 2 hours for hemostats provides complete sterilization.

An alternate form of apparatus embodying my invention is shown in Figure 2 and comprises nested cylinders 1' and 2', defining a sterilization chamber 5', and a base 6' having a passage 7' and valve 21' all of which function in substantially the same manner to obtain the same results as the cylinders 1 and 2, base 6, passage 7, and valve 21 of the preferred form of my invention described above.

This form of my apparatus is preferably adapted for use with a sterilant-containing ampule which is fracturable, such as a glass ampule 14' having a narrow neck or laterally reduced portion 35. To this end I preferably provide a housing 11', which defines a chamber 12' for the reception of the ampule 14' and is secured to or mounted on the base 6' in concentric axial extension of the passage 7' and has a side wall 36 formed from a self-sustaining flexible material, such as rubber, whereby the housing 11' may be bent sufficiently to break the ampule 14', at the neck 35. A removable end piece 38, which is secured to side wall 36 as by threads 39, conveniently closes the remote or free, rightward as viewed, end of chamber 12' and prevents the sterilant from escaping from the apparatus when released from the ampule.

A filter 25' is preferably disposed within the passage 7' intermediate the valve 21' and chamber 5' and functions for the same purpose as the filter 25 described above.

My modified apparatus is shown by way of illustration with modified seal means which is disposed and functions between the cylinders 1' and 2', for the same purposes as seal 26 is disposed and functions between the cylinders 1 and 2, and comprise a pair of vertically spaced relatively narrow bands 26' formed from any convenient material and mounted on one cylinder and having a sliding fit with the adjacent surface of the other cylinder.

My modified apparatus also preferably includes means for adsorbing the noxious gases expelled therefrom when the sterilization cycle is completed. As shown such means comprises a cartridge 28' disposed in the remote, upper as viewed, end of the outer cylinder 2', containing an adsorbent 30' and having an imperforate lower wall 31' which forms the upper wall of the chamber 5' and is provided with a valve 27' adapted to permit fluid to flow from chamber 5' into cartridge 28' but not vice versa and a perforate upper wall 33' providing communication between the cartridge 28' and the atmosphere but retaining the adsorbent 30' within the cartridge.

The operation and considerations relative thereto of the apparatus shown in Figure 2 is substantially similar to that of the apparatus shown in Figure 1 and described above, except for the procedure and means for releasing the sterilant from the ampule 14'. In this instant the ampule 14' is merely inserted within the chamber 12' neck first, and then when it is desired to release the sterilant the housing 11' is flexed or bent adjacent the neck 35 of the ampule to break the same.

In those instances where the instruments to be sterilized are especially complicated or include long capillary tubes or the like it may be desirable to initially impose a greater vacuum in the sterilization chamber than can be obtained by pulling the cylinders 1 and 2 apart in the manner described above, in order to insure that the air surrounding and adsorbed by the contaminated areas is removed and to permit the more rapid diffusion of the sterilant into contact with the contaminating microorganism.

In such an instance as shown, for example, in Figure 2, my apparatus may be provided with an adapter cap 41, which fits over the upward end, as viewed, of the out cylinder and is provided with a nipple 43, for receiving a hose or conduit otherwise connected with a water aspirator or similar device adapted to induce a vacuum.

Another preferred form of housing or container for the ampule or container within which the sterilant is initially confined is shown in Figure 3 and indicated generally at 45. Housing 45 is particularly adapted to receive an ampule or container which must be pierced in order to release the contents thereof.

Briefly housing 45 comprises a hollow elongated member, which is in communication with the sterilization chamber of the sterilizing apparatus and is adapted to receive the ampule or container of sterilant, a tool or needle for piercing the ampule, means biasing the ampule away from the tool and means to displace the ampule toward and into functional engagement with the tool. The housing 45 may be adapted for use with any sterilizing apparatus embodying other features and concepts of my invention but for convenience is shown as part of an apparatus having a base 6", which otherwise functions, either in the manner of the base 6 or the base 6'.

The housing 45 preferably and conveniently comprises a base 46, a lower body portion 48, an upper body portion 49, and a cap 50. When, as I prefer, the housing 45 is disposed vertically the underside of the base portion 46 preferably lies in the same plane as the bottom of the base 6".

The body portions 48 and 49 are secured to the base 46 and cap 50, respectively, and are in turn releasably secured together and function to provide a chamber 51 for the reception of the ampule 14 and to house the internal parts of the sterilant releasing mechanism. The cap 50 supports movable external means for activating the sterilant releasing mechanism.

More particularly and preferably base 46 is provided with a bore 53 which functions as a passage for the released sterilant and has one end which opens laterally and is threaded internally to receive a nipple or other connecting member 54 and a second end which opens upwardly and is flared and internally threaded to receive a plug 55. Plug 55 supports a piercing tool such as metallic needle 56, which is preferably pressfitted into a centrally disposed bore. Plug 55 is also provided with a plurality of bores 58 extending therethrough and providing communication between chamber 51 and bore 53 for the passage of released sterilant. Base 46 is also conveniently threaded externally at its upper end for the reception of body portion 48.

A spring 60 is disposed within body portion 48 and about plug 55. The lower end, as viewed, of spring 60 seats upon base 46 and the upper end engages about and supports a collar 61, which is hollow and has its upper interior formed complementary to and receives and supports the necked end of an ampule. Spring 60 has sufficient strength and length to support an ampule 14 of sterilant out of contact with needle 56, when no force is exerted on the ampule in opposition to the spring but compresses sufficiently to permit the ampule to engage the needle and be pierced thereby when a sufficient force is exerted on the ampule in opposition to the spring.

The body portions 48 and 49 of housing 45 are releasably secured together, as by means of a collar 62, which overlies and engages a flange 63 formed on one body portion, 49 for example, and threadably engages a complementary flange 64 formed on the other body portion 48. The upper body portion 49 is conveniently threadably secured to the cap 50 and is provided with an internal shoulder or stop 66 which is curved complementary to ampule 14 and forms the top of chamber 51.

A free piston or plunger 67 is slidably supported by the shoulder 66 and a central bore 69 provided in cap 50. The piston 67 has a flange 70 intermediate its ends which reciprocates within the end 72 of body portion 49 adjacent cap 50 and limits the movement of the piston in other direction by engagement with shoulder 66 or cap 50 respectively. The lower end, as viewed, of piston 67 extends through shoulder 66 and is adapted to bear upon ampule 14 and to have sufficient travel to move the ampule relative to the needle 56, enough to ensure that the needle pierces the ampule.

In order to apply the force and motion to piston 67 necessary to displace the piston 67 and thereby the ampule 14 against the needle 56 in opposition to the spring 60, I preferably provide the cap 50 with an axially extending transverse groove or slot 74 which intersects bore 59, and support a lever 75 for pivotal movement about an axis within and transverse to said slot. Lever 75 has a cam 77 adjacent piston 67. The cam 77 and piston 67 are maintained in operative relation, when an ampule is disposed within chamber 51, by the action of spring 60 and the cam is adapted to displace the piston and thereby the ampule a distance sufficient to ensure that the ampule is pierced through by the needle, when the lever 75 is moved, by the operator, from the full line position shown in Figure 3 to the dotted line position shown therein.

To prevent the released sterilant from leaking into the atmosphere adjacent the apparatus, I preferably provide a seal 79 between flanges 63 and 64 and a seal 80 about piston 67 intermediate flange 70 and cap 50.

In order to provide communication between housing 45 and base 6" and permit liquids to flow into but not from the base in accordance with precepts of my invention set forth in connection with the forms of my invention shown in Figures 1 and 2, I preferably provide nipple 54 with a central bore having an enlarged outer portion, which functions as a valve chamber 84, and an internal shoulder 85, which functions as a valve seat, and base 6" with a nipple 86 also having an enlarged outer portion and an internal shoulder or seat 88 mutually facing seat 85.

A valve 90 mounted on a coil spring 91 is disposed within the valve chamber 84 with the spring engaging seat 88 and the valve biased thereby into engagement with seat 85, unless and until the pressure within housing 51 is sufficient to displace the valve leftwardly, as viewed, to permit fluid to flow through the adjacent nipples and into the base 6". A coupling or nut 92 secures the nipples 54 and 86 together and in proper relative relation to ensure proper functioning of the valve.

In operation this form of ampule housing or container is mounted as a part of a sterilizing apparatus embodying my invention.

The collar 62 is loosened and the housing 45 is separated. An ampule containing sterilant is placed within the chamber 51 with its neck extending downwardly, as viewed, and supported by and within the collar 61. The housing 45 is then reassembled and the collar 62 tightened. The ampule is then supported within the chamber 51 by the spring 60 in the position shown in Figure 3. When it is desired to release the sterilant the operator pulls down on lever 75 causing the cam 77 to depress the piston 67 and ampule 14 against the force of spring 60, thereby forcing the ampule onto the needle 56 and piercing it. The sterilant is then released and flows through the valve 90 and thence into the sterilization chamber. When it is desired to open and evacuate the sterilization chamber in the manner described above with respect to the forms of my invention shown in Figures 1 and 2 the collar 62 is loosened and the upper part of the housing 45 removed in order to provide communication with the atmosphere.

Modifications, changes and improvements to the above described and illustrated preferred and modified forms and embodiments of my invention may occur to those skilled in the art without departing from the spirit and substance of my invention. Accordingly I do not wish to be limited in the scope of my patent to the forms and embodiments of my invention herein particularly illustrated and described nor in any manner inconsistent with the advance by which my invention has promoted the art.

I claim:

1. A sterilizing apparatus comprising inner and outer nested cylinders adapted for relative reciprocal movement and having upper and lower ends and defining the lateral walls of an adjustable chamber, the upper end of said inner cylinder and the lower end of said outer cylinder being open and mutually overlapping, a perforate transverse wall carried by said inner cylinder near the lower end thereof and defining the lower wall of said chamber, a base supporting said inner cylinder at the lower end thereof, a passage in said base and extending between said chamber and the exterior of said base, a bushing secured to said base and having a bore axial aligned with said passage and external threads concentric therewith, a first valve disposed in said passage and adapted to permit fluid flow into said chamber, a filter in said inner cylinder below and adjacent said perforate bottom, a plurality of members providing evaporation surfaces disposed in said base and inner cylinder intermediate said valve and said chamber, a piercing tool carried by said base within said bore of said bushing and having a bore in axial extension of said passage, a housing threadably engaging said threads and defining a receptacle for the reception of an ampule, a resilient cylindrical seal disposed in said outer cylinder and slidably engaging said inner cylinder, a lower transverse wall in said cylindrical seal longitudinally spaced from the upper end of said outer cylinder and defining the upper wall of said chamber, a perforate upper transverse wall in said cylindrical seal adjacent the upper end of said outer cylinder, an adsorbent in said cylindrical seal intermediate said lower and upper transverse walls thereof and a second valve carried by said lower transverse wall of said cylindrical seal and adapted to permit fluid flow from said chamber.

2. A sterilizing apparatus comprising inner and outer nested cylinders adapted for relative reciprocal movement and having upper and lower ends and defining the lateral walls of an adjustable chamber, the upper end of said inner cylinder and the lower end of said outer cylinder being open and mutually overlapping, a base supporting said inner cylinder at the lower end thereof, a passage in said base and providing communication between said chamber and the exterior of said base, a first valve disposed in said passage and adapted to permit fluid flow into said chamber, a plurality of evaporation surfaces intermediate said valve and said chamber, a piercing tool carried by said base, a housing detachably secured to said base in communication with said passage and defining a receptacle for the reception of an ampule, a cylindrical seal disposed in said outer cylinder and slidably engaging said inner cylinder, an adsorbent cartridge having a lower transverse wall defining the upper wall of said chamber and supporting a valve adapted to permit fluid flow from said chamber into said cartridge, a perforate upper wall in communication with the atmosphere and an adsorbent disposed in said cartridge, a perforate plate in said chamber intermediate said passage and the upper end of said inner cylinder, and a filter disposed intermediate said receptacle and said plate.

3. A sterilizing apparatus comprising inner and outer nested members adapted for relative reciprocal movement and having upper and lower ends and defining the lateral walls of an adjustable chamber, the upper end of said inner member and the lower end of said outer member being open and mutually overlapping, a base supporting said inner member at the lower end thereof, a passage in said base providing communication with said chamber, first valve means adapted to permit fluid flow through said passage into said chamber, a housing carried by said base and defining a receptacle, said receptacle being in communication with said passage and being adapted to receive an ampule containing sterilant, means for engaging an ampule received in said receptacle to open the same, a seal carried by one said member and slidably engaging the other said member and second valve means adapted to permit fluid flow from said chamber.

4. The apparatus according to claim 3 with an adsorbent cartridge upstream of said second valve means, said second valve means permitting fluid flow into said cartridge, an adsorbent in said cartridge and means providing communication between said cartridge and the atmosphere.

5. The apparatus according to claim 3 in which said means for opening an ampule comprises means for flexing a part of said housing relative to a part of an ampule received in said receptacle.

6. The apparatus according to claim 3 in which said means for opening an ampule comprises a piercing tool disposed in operable relation with an ampule when the same is received in said receptacle and means for inducing relative motion between said tool and an ampule so received.

7. A sterilizing apparatus comprising inner and outer nested members adapted for relative reciprocal movement and defining the walls of an adjustable chamber, means providing communication with said chamber, a first valve means controlling said communication means to permit fluid flow into said chamber, means in communication with said communication means for receiving an ampule containing sterilant, means for engaging an ampule so received to open the same, sealing means carried by one said member and slidably engaging the other said member and a second valve means disposed in operable relation with said chamber and adapted to permit fluid flow therefrom.

8. The apparatus according to claim 7 in combination with an ampule containing a liquefied gaseous sterilant, said ampule being disposed within said ampule receiving means.

9. A sterilizing apparatus comprising a housing defining an adjustable volume sterilization chamber, a receptacle for receiving a container containing a sterilant, means providing communication between said receptacle and said chamber, and valve means adapted to permit fluid flow into said chamber through said communication means.

10. The apparatus according to claim 9 with filter means disposed in said communication means.

11. The apparatus according to claim 9 in combination with an ampule containing sterilant, said ampule being disposed in said receptacle.

12. The apparatus according to claim 9 with means for engaging an ampule disposed in said receptacle to open the same.

13. The apparatus according to claim 9 with second valve means adapted to permit fluid flow from said chamber.

14. The apparatus according to claim 13 with adsorbent means disposed upstream of said second valve means and means directing fluid flow from said chamber through said adsorbent means.

15. A sterilizing apparatus for gaseous sterilization comprising a housing defining an enclosed sterilization chamber, a second housing defining a second chamber for receiving a container of sterilant, means interconnecting said housings and providing communication between said second chamber and said sterilization chamber, a container of sterilant in said second chamber, means operable from without said housings for selectively engaging said container to open said container and release said sterilant and means for purging said sterilization chamber of said sterilant.

16. A sterilizing apparatus for gaseous sterilization comprising a housing defining an enclosed adjustable volume sterilizing chamber, a receptacle for receiving a container of sterilant, means providing communication between said chamber and receptacle and means operable from without said receptacle for selectively opening a container of sterilant disposed therein.

17. The apparatus according to claim 16 in which said housing defines a reciprocably adjustable volume sterilization chamber.

18. The gaseous sterilizing apparatus according to claim 16 in which a container having a weakened portion fracturable upon application of a bending force is disposed in said receptacle and said means for selectively opening said container comprises means for bending one portion of said second housing relative to another portion thereof adjacent said weakened portion of said container to break said container at said weakened portion thereof.

19. The gaseous sterilizing apparatus according to claim 16 in which said means for selectively opening a container disposed in said receptacle comprises a piercing tool disposed within said second chamber and adapted to be in operable relation with the container and means, operable from without said housing, for selectively inducing relative movement between said piercing tool and container.

20. The gaseous sterilizing apparatus according to claim 16 in which said means for engaging and opening a container disposed in said receptacle comprises a piercing tool rigidly supported within said second chamber, spring means for engaging the container and biasing it away from said tool, an operating lever pivotally supported on said second housing and means extending through said second housing and in operable relation with said lever and container for transmitting force and motion from said lever to the container in opposition to said spring means.

21. The gaseous sterilizing apparatus according to claim 20 in which said second housing and said second chamber have a longitudinal axis and said tool is disposed at one end of said second chamber, said spring means comprises a coil spring disposed about said tool, said force transmitting means comprises a free piston having one end within and one end without said second chamber and having reciprocable movement along said axis at the end of said second housing and said second chamber remote from said tool, and said lever pivots about an axis extending transverse of said longitudinal axis and has a camming surface adapted to operatively engage said outer end of said piston.

References Cited in the file of this patent

UNITED STATES PATENTS

| | | |
|---|---|---|
| Re. 22,284 | Griffith et al. | Mar. 9, 1943 |
| 559,203 | Pennington | Apr. 28, 1896 |
| 819,383 | Sprague | May 1, 1906 |
| 2,007,738 | Baer | July 9, 1935 |
| 2,134,924 | Moon | Nov. 1, 1938 |
| 2,337,061 | Murch | Dec. 21, 1943 |
| 2,771,644 | Martin | Nov. 27, 1956 |

FOREIGN PATENTS

| | | |
|---|---|---|
| 684,590 | France | Nov. 18, 1930 |
| 807,827 | France | Oct. 26, 1936 |